US012211462B1

(12) United States Patent
Tseng et al.

(10) Patent No.: US 12,211,462 B1
(45) Date of Patent: Jan. 28, 2025

(54) VARIABLE REFRESH RATE FLICKER CALCULATION METHODOLOGY

(71) Applicant: Dell Products L.P., Round Rock, TX (US)

(72) Inventors: Kuo-Wei Tseng, Taiwan (TW); Hong-Ji Huang, Taiwan (TW); Yu-Chen Liu, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/225,718

(22) Filed: Jul. 25, 2023

(51) Int. Cl.
*G09G 5/00* (2006.01)

(52) U.S. Cl.
CPC ..... *G09G 5/003* (2013.01); *G09G 2320/0247* (2013.01); *G09G 2340/0435* (2013.01); *G09G 2360/16* (2013.01)

(58) Field of Classification Search
CPC ....... G09G 2330/06; G09G 2340/0435; G09G 2370/08; G09G 5/008; G09G 3/3611; G09G 3/36; G09G 3/3685
See application file for complete search history.

(56) References Cited

U.S. PATENT DOCUMENTS

2023/0033014 A1* 2/2023 Masuda ................ G01J 1/0228

OTHER PUBLICATIONS

Masuda, "Flicker Calculation Method for Variable Refresh Rate Display", Proceedings of the International Display Workshops, vol. 28, 2021, p. 690-693 (Year: 2021).*
Satoshi Masuda et al., Flicker Calculation Method for Variable Refresh Rate Display, Proceedings Of The International Display Workshops, PRJ7-1, vol. 28, Dec. 2021.

* cited by examiner

*Primary Examiner* — Yuzhen Shen
(74) *Attorney, Agent, or Firm* — Terrile, Cannatti & Chambers, LLP; Emmanuel A. Rivera

(57) ABSTRACT

Described herein is a system and method for calculating variable refresh rate (VRR) flicker of a display used for information handling systems. VRR display data is provided to the display which generates a raw optical waveform. The raw optical waveform is captured by an optical sensor. The captured raw optical waveform is weighted using an inverse Fast Fourier Transform from a Temporal Contrast Sensitivity Function (TCSF). Calculating the flicker value of the weighted optical waveform over a defined moving window is performed. The flicker average and flicker maximum of the flicker value is used to determine a VRR flicker value.

14 Claims, 6 Drawing Sheets

400

500

VARIABLE REFRESH RATE FLICKER CALCULATION METHODOLOGY

BACKGROUND OF THE INVENTION

Field of the Invention

The present invention relates to information handling systems. More specifically, embodiments of the invention provide for calculation of variable refresh rate (VRR) flicker of display screens of information handling systems.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated.

Information handling systems, such as notebook or laptop computers, make use of displays to provide video. Displays implement refresh rates which is the number of times per second that a display draws an image. Certain displays may use a static refresh rate that does not change; however, the trend is for displays to use variable refresh rates or VRR. VRR can provide various useful applications, including preventing screen tearing and stuttering from framerate inconsistency. Lower refresh rates (i.e., frequency) can reduce power consumption, and higher refresh rates (i.e., frequency) can provide smoother motion. Compared to displays with a static refresh rate, the refresh rate of VRR displays can be different between different frames and result in flicker artifacts. Flicker is flashing or unsteadiness in an image in a display.

It is desirable to determine such VRR flicker, and particularly during refresh rate switching. Traditionally, calculation of flicker used a method prescribed by the Japan Electronics and Information Technology Industries Association (JEITA). The JEITA method processes in frequency domain which is suitable for a static refresh rate; however, for VRR it is necessary to quantize flicker rate during refresh rate transition, and the JEITA method is not suitable. Additionally, the JEITA method does not consider human vision perception for extreme low refresh rates lower than 20 Hz.

The JEITA method is not appropriate for such VRR displays, since VRR has a complicated aperiodic waveform. The JEITA method is essentially designed for static refresh rate displays, and applicable when a display's waveform is periodic. The JEITA method considers a single frequency component; however, VRR displays implement multiple frequencies.

SUMMARY OF THE INVENTION

A system, method, and computer-readable medium for calculating variable refresh rate (VRR) flicker of a display comprising capturing a raw optical waveform generated by the display; applying an inverse Fast Fourier Transform of a Temporal Contrast Sensitivity Function (TCSF) to the captured raw optical waveform to generate a weighted luminance waveform, and applying a moving time window to calculate the flicker trend, taking the average and maximum flicker value of the flicker trend to determine VRR flicker.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations provide for a variable refresh rate (VRR) measurement that provides enhanced accuracy and repeatability with high-speed capable of measuring a wide range for VRR displays. The described VRR flicker measurement method provides for applying a signal source waveform to a display with a high/low display refresh rate combined with different switching frequencies. The raw optical waveform shown on the display is applied with an inverse Fast Fourier Transform (FFT) of an International Electrotechnical Commission (IEC) Temporal Contrast Sensitivity Function (TCSF) to produce a weighted luminance waveform that is kept in time domain. VRR Flicker is calculated by using a moving window (time), and taking average VRR Flicker ($VRRF_{avg}$) and maximum VRR Flicker ($VRRF_{max}$) values.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
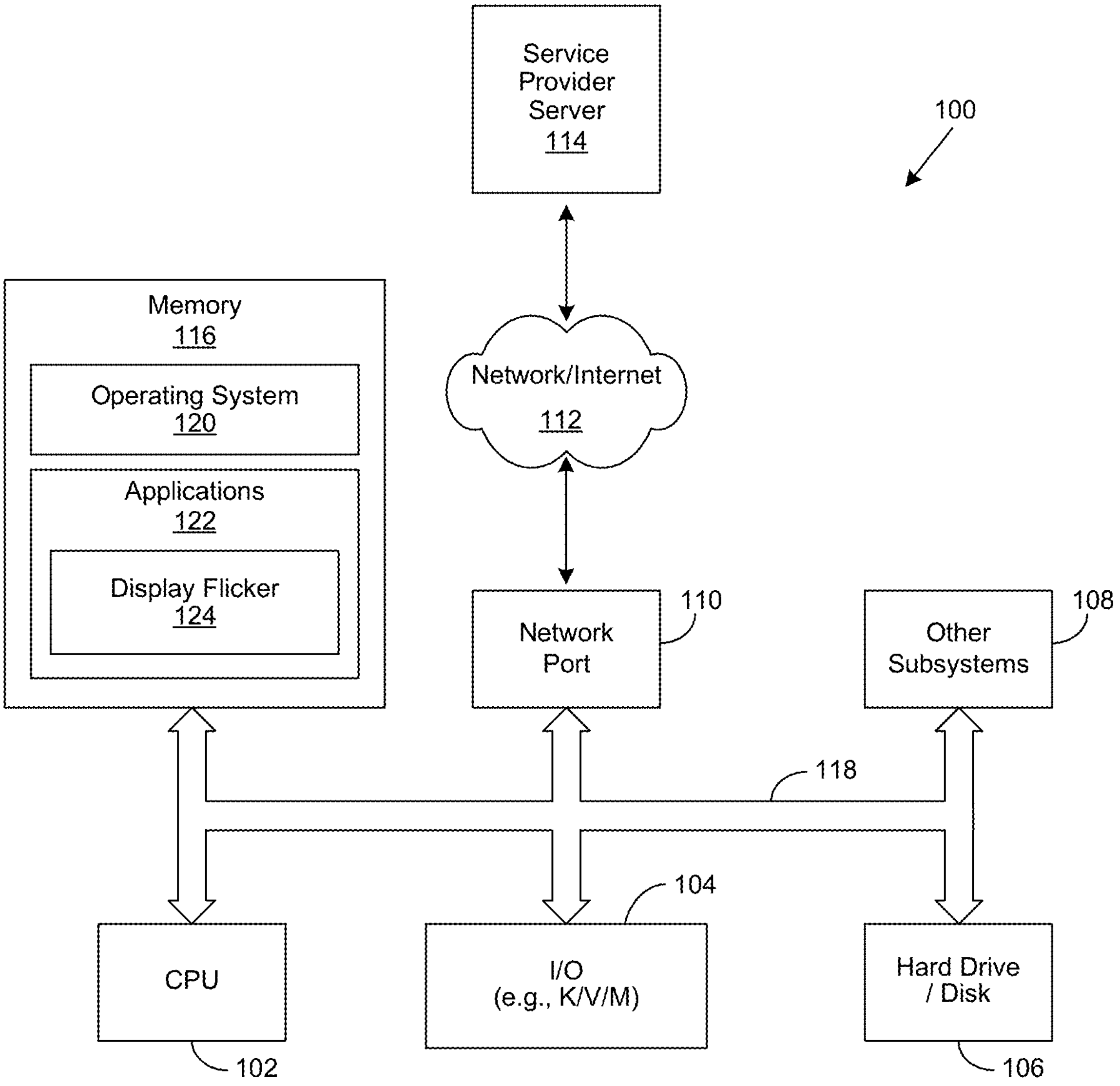
FIG. 1 is a general illustration of an information handling system to implement the system and method of the present invention.

FIG. 1 is a generalized illustration of an information handling system 100 that can be used to implement the system and method of the present invention. The information handling system 100 can be implemented as a computing device, such as a laptop computer, desktop computer, etc.

The information handling system 100 includes a processor (e.g., central processor unit or "CPU") 102. Implementations further provide for other processors and controllers, including application specific controllers (e.g., memory controller). The information handling system 100 includes input/output (I/O) devices 104, such as a microphone, a keyboard, a video/display, a mouse, and associated controllers (e.g., K/V/M). In particular, I/O devices 104 can include an optical analyzer/sensor, as further described herein, and used in the calculating/determining display VRR flicker.

The information handling system 100 includes a hard drive or disk storage 106, and various other subsystems 108. In various embodiments, the information handling system 100 also includes network port 110 operable to connect to a network 112 described herein, where network 112 can include one or more wired and wireless networks, including the Internet. Network 112 is likewise accessible by a service provider server 114.

The information handling system 100 likewise includes system memory 116, which is interconnected to the foregoing via one or more buses 118. System memory 116 can be implemented as hardware, firmware, software, or a combination of such (e.g., RAM, ROM, DIMM, etc.).

System memory 116 further includes an operating system (OS) 120. Embodiments provide for the system memory 116 to include applications 122. Applications 122 can be implemented as software or firmware, and can be downloaded or preprogrammed. Implementations provide for a display flicker application 124 that implements algorithms described herein in calculating/determining display VRR flicker.

Figure 2:
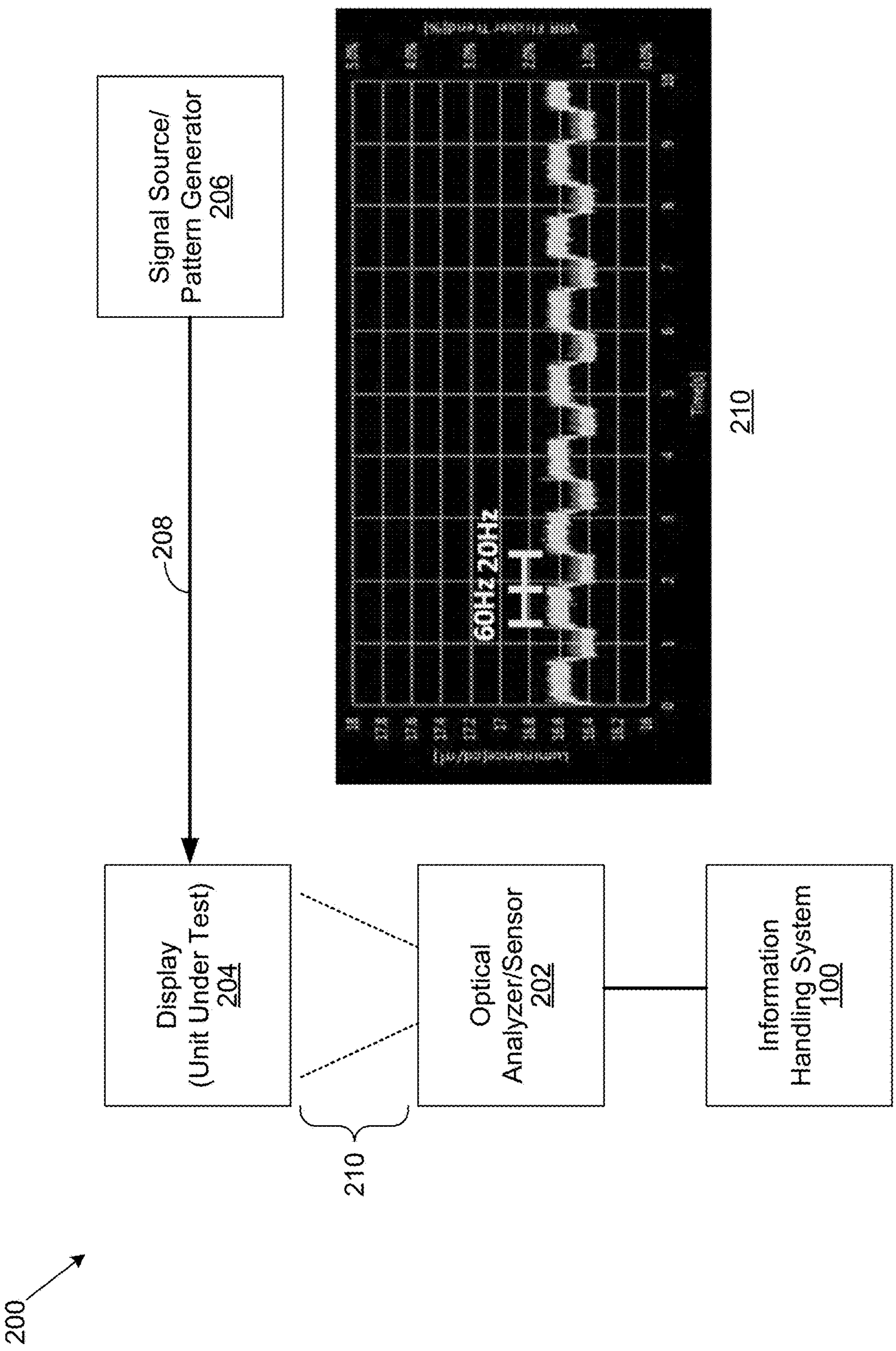
FIG. 2 illustrates a system for calculating/determining display VRR flicker.

FIG. 2 shows a system 200 for calculating/determining display VRR flicker. The system 200 can include an information handling system 100 as described in FIG. 1. The information handling system 100 is configured to or includes an optical analyzer/sensor 202. An example of such an optical analyzer/sensor 202 is Konica Minolta™ display optical analyzer CA-410.

The system 200 includes a display 204 that is considered as a unit under test. In specific, display 204 is tested in system 200 for VRR flicker as described herein. Implementations provide for the display 204 to be tested as part of integration/verification compliance into a system, such as an information handling system that includes laptop computers. Implementations can also provide for determining in use performance of the display 204 to assure compliance in regard to VRR flicker.

A signal source/pattern generator 206 is included in system 200. The signal source/pattern generator 206 provides a VRR display data 208 to the display 204. An example of such a VRR display optical waveform 210 is a VRR display optical waveform with a 20 Hz-60 Hz display refresh rate and 2 Hz frequency switching (i.e., for every 0.5 seconds the refresh rate changes).

The display 204 presents/shows the VRR display data 208. The optical analyzer/sensor 202 captures optical waveform 210. The captured VRR display optical waveform 210 is processed by the information handling system 100 as further described herein.

Figure 3:
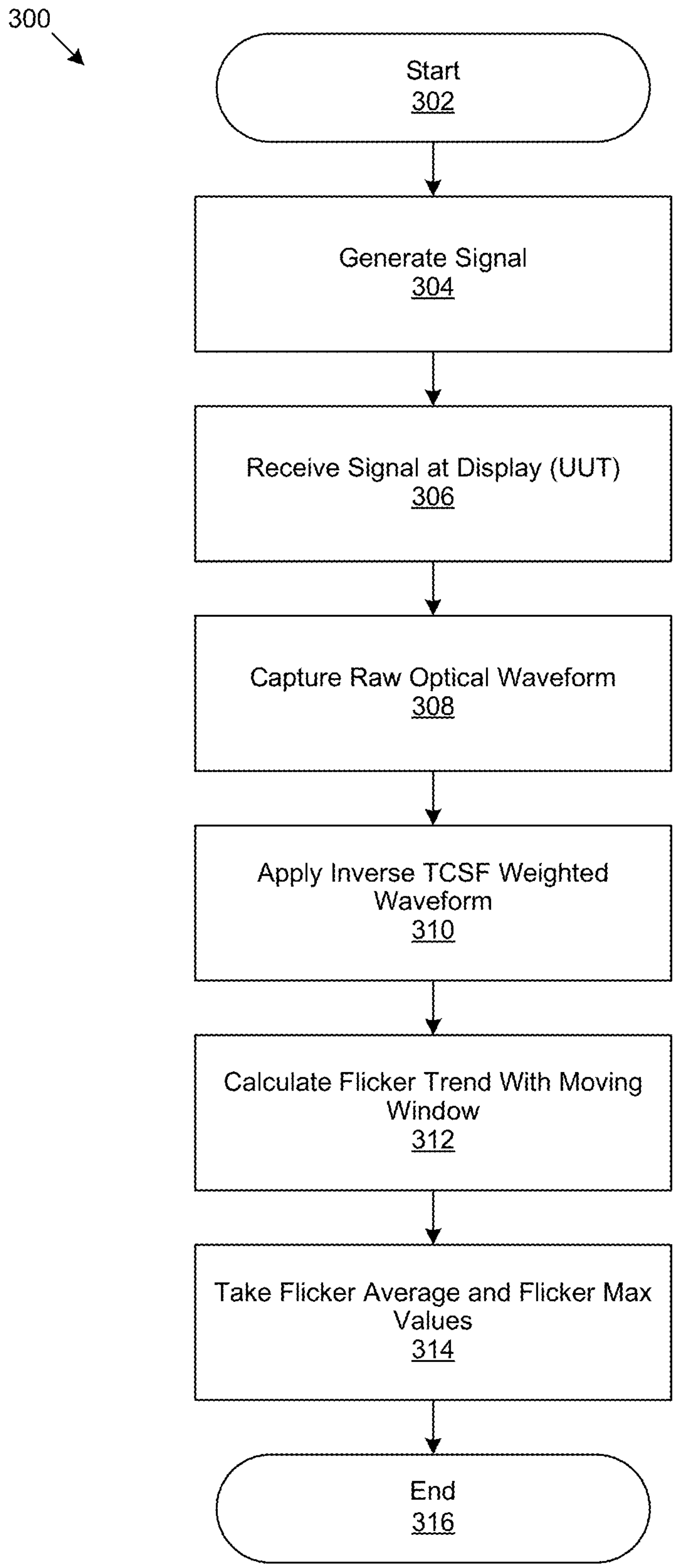
FIG. 3 is a generalized flowchart for calculation of variable refresh rate (VRR) flicker of display screens of information handling systems.

FIG. 3 is a generalized flowchart 300 for calculation of variable refresh rate (VRR) flicker of display screens of information handling systems. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 302 the process 300 starts. At step 304, VRR display data 208 is generated. Implementations provide for the signal source/pattern generator 206 described in FIG. 2. An example of such an optical waveform signal 210 as VRR display optical waveform with a 20 Hz-60 Hz display refresh rate and 2 Hz frequency switching (e.g., every 0.5 s change the refresh rate)

At step 306, the VRR signal 208 is received and processed by a display, such as display (unit under test) 204 described in FIG. 2. At step 308, the raw optical waveform that is shown on the display (e.g., display 204) is captured. Implementations provide for an optical analyzer/sensor, such as optical analyzer/sensor 202 described in FIG. 2 to capture the raw optical waveform. The captured optical waveform can be sent to the information handling system 100 as described in FIGS. 1 and 2.

Implementations provide for processing subsequently described steps of process 300 to be performed by information handling system 100 described in FIGS. 1 and 2, and particularly by the display flicker application 124. In certain implementations, the optical analyzer/sensor 202 is configured to perform the subsequently described steps of process 300.

At step 310, inverse International Electrotechnical Commission (IEC) Temporal Contrast Sensitivity Function (TCSF) is applied. In certain implementations, the IEC TCSF is a known function that is defined by the IEC.

Figure 4:
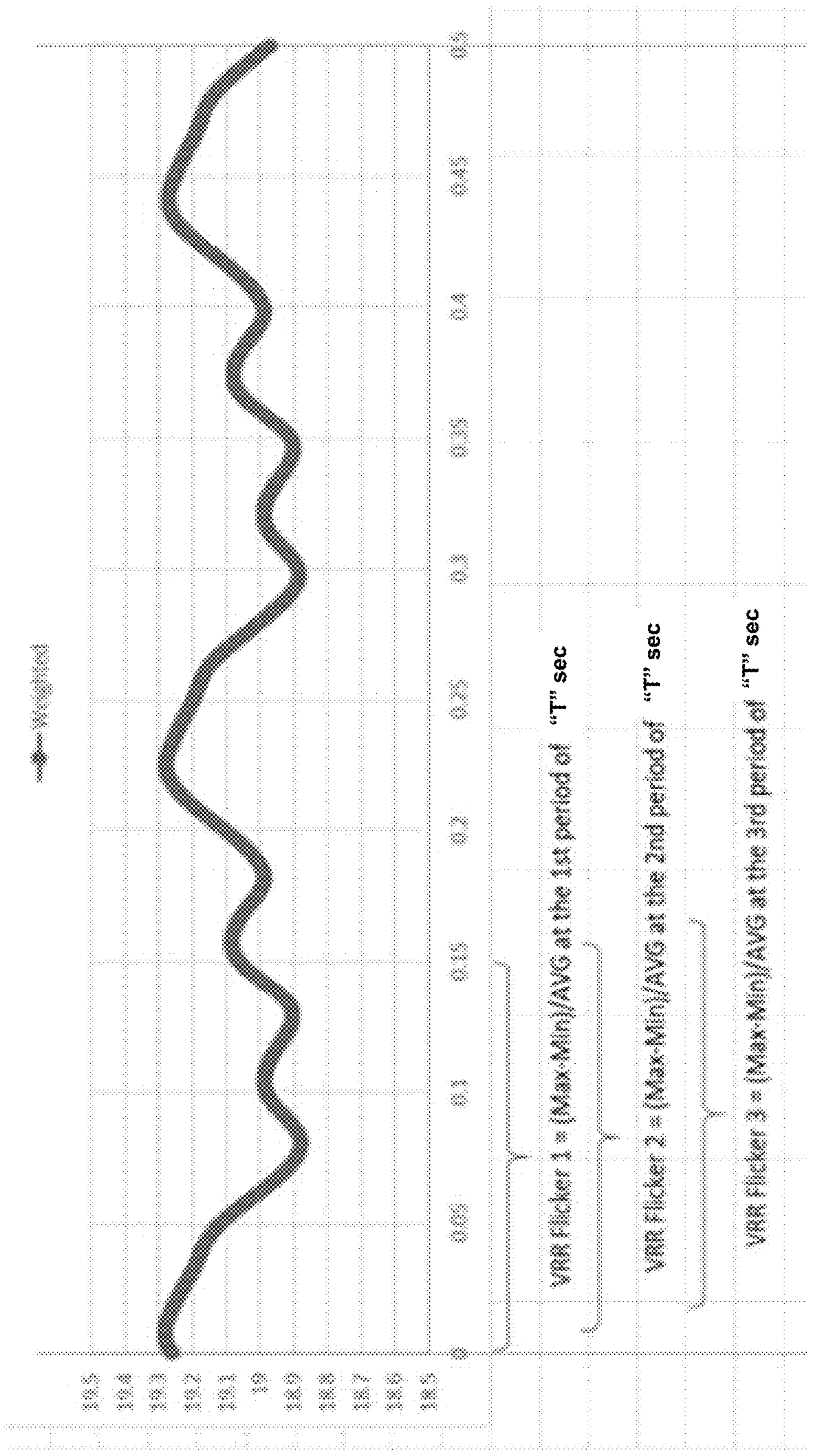
FIG. 4 illustrates a waveform applied TSCF weighted luminance waveform.
Figure 5:
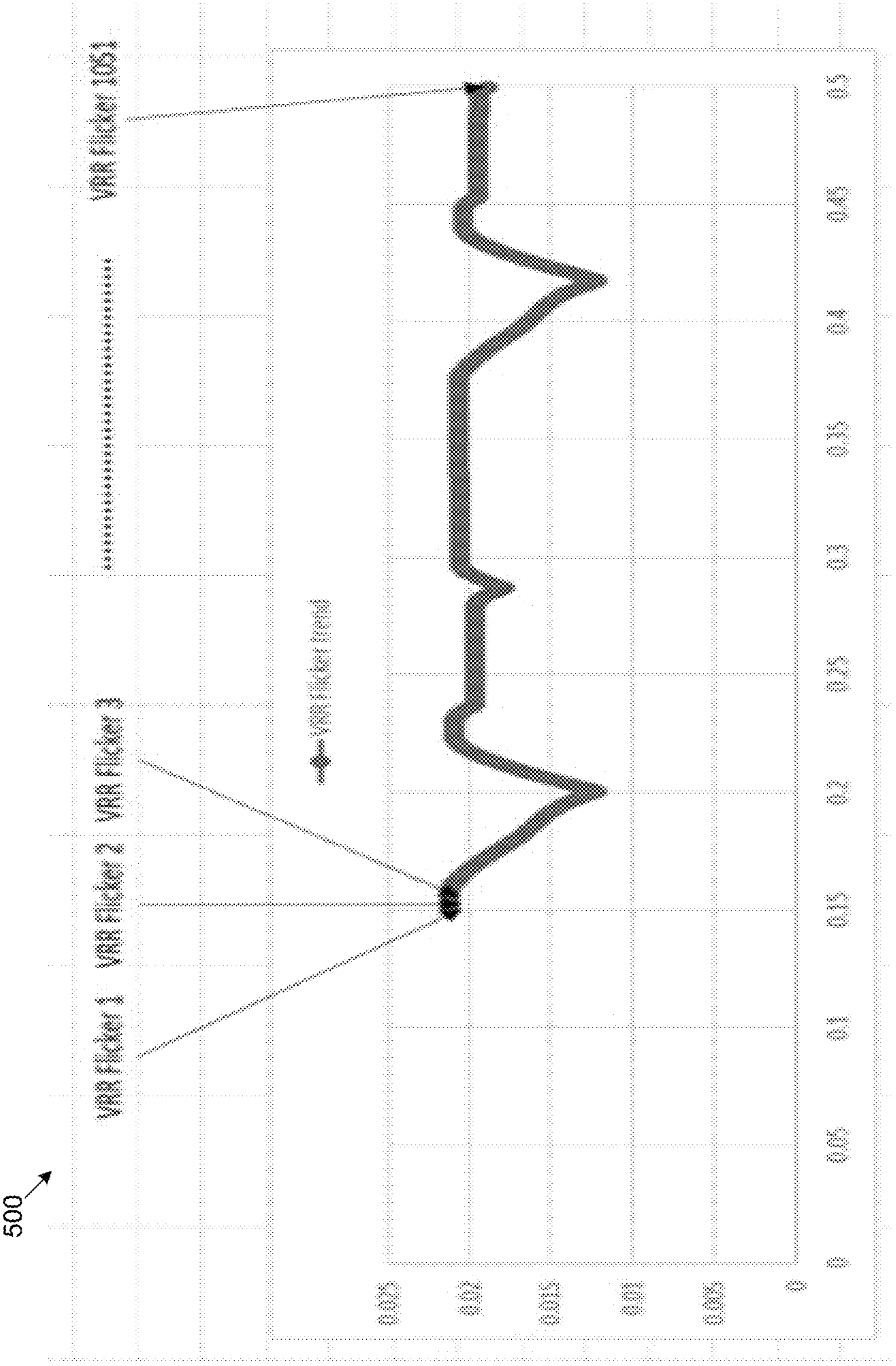
FIG. 5 illustrates curve of a flicker trend calculated by (Max Luminance-Min Luminance)/average Luminance taken over a time window.

At step 312, flicker is calculated. An inverse Fast Fourier Transform (FFT) of the IEC TCSF is applied to the captured raw optical waveform to arrive at a weighted luminance waveform, which can be applied per a moving window (time). Referring now to FIG. 4, curve 400 shows a moving window of 150 msec on a TSCF weighted luminance waveform. The moving window of 150 msec. is an example. Moving window range can include 20 msec. to 1000 msec. Referring now to FIG. 5, a curve 500 shows a flicker trend of Luminance=(Max−Min)/average taken over a 150 msec window (i.e., taken every 150 msec) from TCSF weighted luminance waveform.

Figure 6:
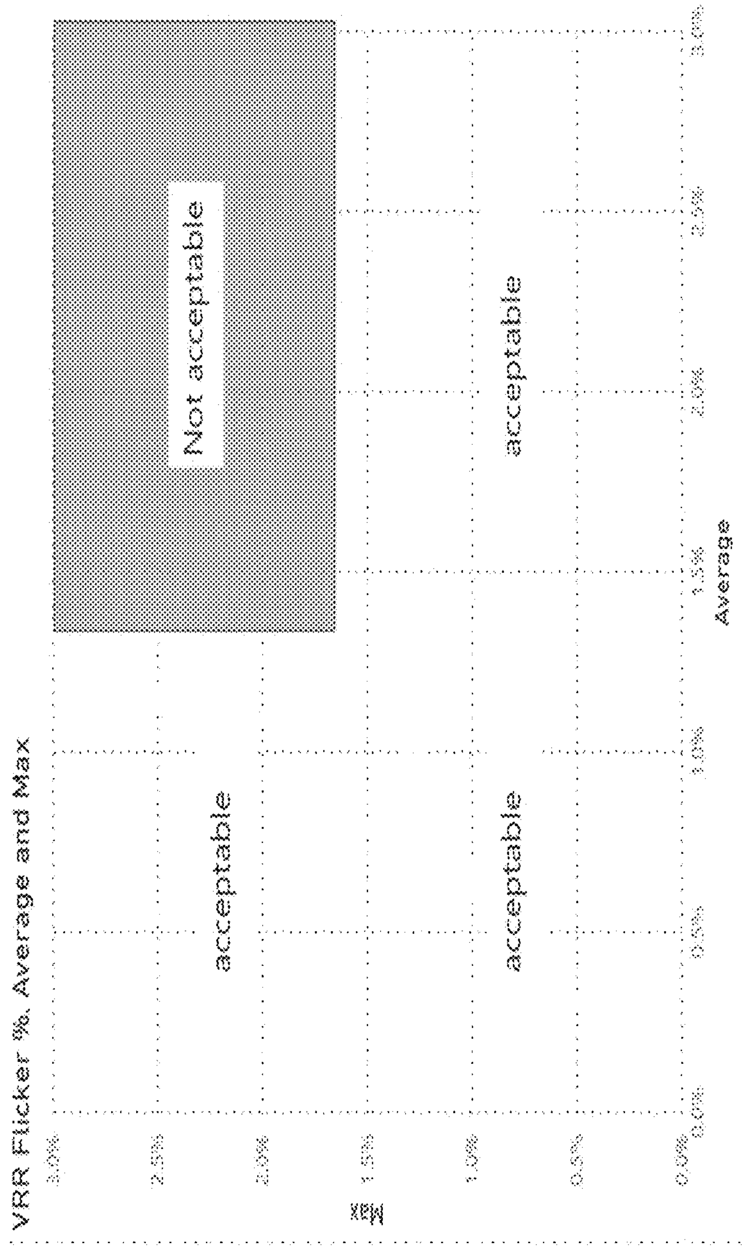
FIG. 6 illustrates plots of VRR Flicker average ($VRRF_{avg}$) versus flicker maximum VRR Flicker ($VRRF_{max}$) for acceptable and unacceptable flicker.

Referring back to FIG. 3, at step 314, VRR Flicker average ($VRRF_{avg}$) value and VRR Flicker maximum ($VRRF_{max}$) value are taken. Referring now to FIG. 6, a graph 600 shows VRR Flicker average (VRRFavg) versus flicker maximum VRR Flicker (VRRFmax) for acceptable and unacceptable flicker. In particular, grade A plots show illustrate displays without flicker. Grade B plots illustrate flicker margins that are marginal pass. Grades C illustrate flicker margins fail. Grades D illustrate flicker is not acceptable.

For example, VRR Flicker average ($VRRF_{avg}$) value is less than or equal to 1.33% as acceptable criteria, and VRR Flicker maximum ($VRRF_{max}$) value is less than or equal to 1.62% as acceptable criteria. At step 316, the process 300 ends.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A method for calculating variable refresh rate (VRR) flicker of a display comprising:

capturing a raw optical waveform generated by the display;

applying an inverse Fast Fourier Transform of a Temporal Contrast Sensitivity Function (TCSF) to the captured raw optical waveform to generate a weighted luminance waveform, applying over a moving time window to calculate flicker trend; and taking a VRR Flicker average ($VRRF_{avg}$) value and a VRR Flicker maximum ($VRRF_{max}$) value of the flicker trend to determine VRR flicker, wherein ($VRRF_{avg}$) value that is less than or equal to 1.33% is acceptable and ($VRRF_{max}$) value that is less than or equal to 1.62% is acceptable.

2. The method of claim 1, wherein the optical waveform has a variable display refresh rate and a particular switching frequency.

3. The method of claim 1, wherein the optical waveform generated by the display is captured by an optical analyzer/sensor.

4. The method of claim 1, wherein the moving time window is between 20 milliseconds to 1000 milliseconds.

5. The method of claim 1, wherein the flicker trend is calculated by (Max Luminance−Min Luminance)/average Luminance.

6. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for calculating variable refresh rate (VRR) flicker of a display and comprising instructions executable by the processor and configured for:

capturing a raw optical waveform generated by the display;

applying an inverse Fast Fourier Transform of a Temporal Contrast Sensitivity Function (TCSF) to the captured raw optical waveform to generate a weighted luminance waveform, applying over a moving time window to calculate flicker trend; and taking a VRR Flicker average ($VRRF_{avg}$) value and a VRR Flicker maximum ($VRRF_{max}$) value of the flicker trend to determine VRR flicker, wherein ($VRRF_{avg}$) value that is less than or equal to 1.33% is acceptable and ($VRRF_{max}$) value that is less than or equal to 1.62% is acceptable.

7. The system of claim 6, wherein the optical waveform has a variable display refresh rate and a particular switching frequency.

8. The system of claim 6, wherein the optical waveform generated by the display is captured by an optical analyzer/sensor.

9. The system of claim 6, wherein the moving time window is between 20 milliseconds to 1000 milliseconds.

10. The system of claim 6, wherein the flicker trend is calculated by (Max Luminance−Min Luminance)/average Luminance.

11. A non-transitory, computer-readable storage medium embodying computer program code for message serialization and deserialization, the computer program code comprising computer executable instructions configured for calculating variable refresh rate (VRR) flicker of a display comprising:

capturing a raw optical waveform generated by the display;

applying an inverse Fast Fourier Transform of a Temporal Contrast Sensitivity Function (TCSF) to the captured raw optical waveform to generate a weighted luminance waveform, applying over a moving time window to calculate flicker trend; and taking a VRR Flicker average ($VRRF_{avg}$) value and a VRR Flicker maximum ($VRRE_{max}$) value of the flicker trend to determine VRR flicker, wherein ($VRRF_{avg}$) value that is less than or equal to 1.33% is acceptable and ($VRRF_{max}$) value that is less than or equal to 1.62% is acceptable.

12. The non-transitory, computer-readable storage medium of claim 11, wherein the optical waveform has a variable display refresh rate and a particular switching frequency.

13. The non-transitory, computer-readable storage medium of claim 11, wherein the moving time window is between 20 milliseconds to 1000 milliseconds.

14. The non-transitory, computer-readable storage medium of claim 11, wherein the flicker trend is calculated by (Max Luminance-Min Luminance)/average Luminance.

* * * * *